United States Patent

Alchin

[11] Patent Number: 5,924,683
[45] Date of Patent: Jul. 20, 1999

[54] SELF-CONTAINED SPRING BALANCE SYSTEM

[75] Inventor: Michael Alchin, Wetherill Park, Australia

[73] Assignee: Alchin & Long Pty Ltd., Wetherill Park, Australia

[21] Appl. No.: 08/132,380

[22] Filed: Oct. 6, 1993

[30] Foreign Application Priority Data

Oct. 19, 1992 [AU] Australia .................................. PL5366

[51] Int. Cl.[6] .................................................... F16F 15/00
[52] U.S. Cl. .......................................................... 267/178
[58] Field of Search ..................................... 267/170, 178, 267/174, 135, 209, 213, 70, 71; 16/197, 198, DIG. 10

[56] References Cited

U.S. PATENT DOCUMENTS

| | | | |
|---|---|---|---|
| 2,577,953 | 12/1951 | De Vries et al. | 16/197 |
| 2,729,418 | 1/1956 | Maynard | 267/178 |
| 3,572,621 | 3/1971 | Whitten | 267/178 |
| 5,062,617 | 11/1991 | Campbell | 267/178 |

FOREIGN PATENT DOCUMENTS 439510  8/1972  Australia .

*Primary Examiner*—Matthew C. Graham
*Attorney, Agent, or Firm*—Ladas & Parry

[57] ABSTRACT

The invention pertains to a spring balance system for sliding windows. The self-contained apparatus comprises a small diameter tube (11) and a larger diameter tube (12). The two tubes are telescopic with respect to one another. A spring (15) extends through the length of both tubes. There is a frictional engagement between the two tubes. At one end there is a means (17) for attaching the apparatus to a sliding window. The other end comprises a support (13).

9 Claims, 2 Drawing Sheets

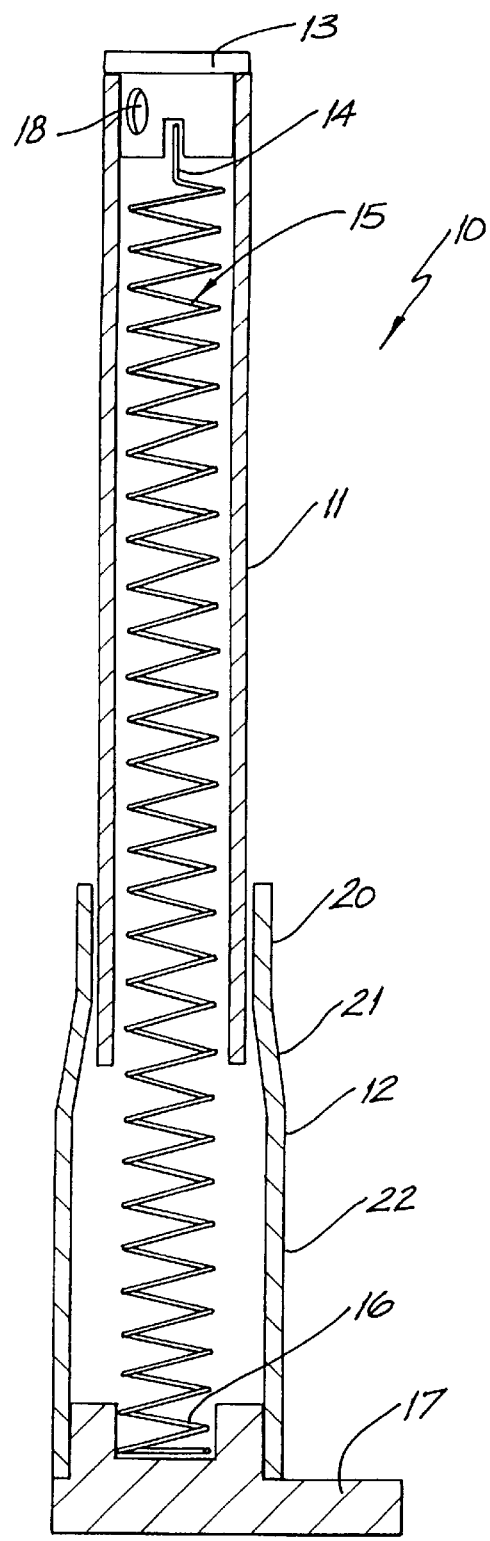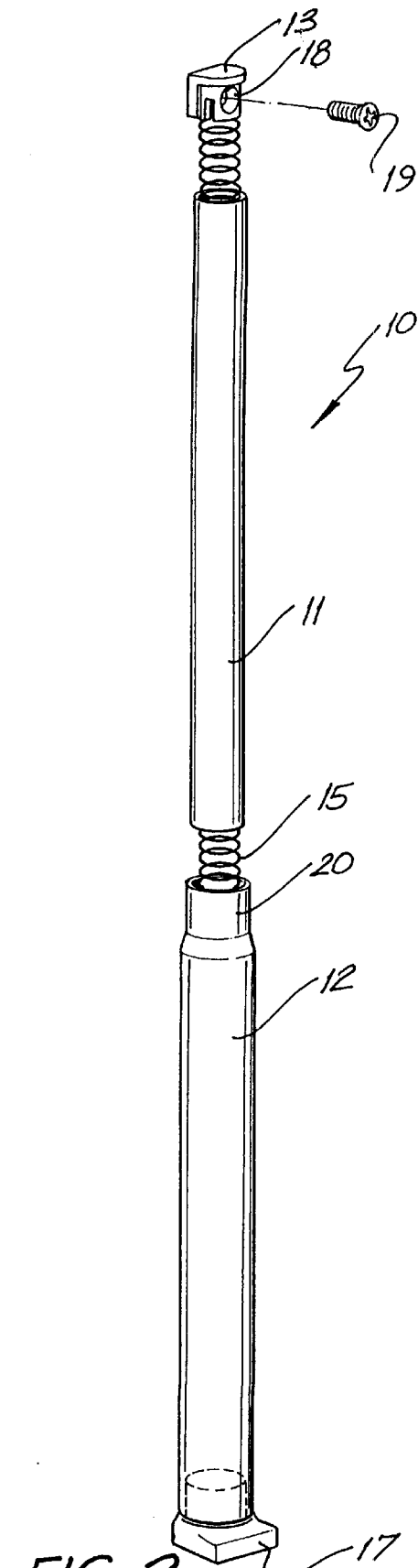
FIG. 1
FIG. 2

SELF-CONTAINED SPRING BALANCE SYSTEM

FIELD OF INVENTION

The invention pertains to spring balance systems for sliding windows and more particularly to a self-contained spring balance system.

BACKGROUND OF THE INVENTION

Vertically sliding windows often require a spring balance or counter weight. These types of systems assist in raising a heavy window and in addition resist the tendency of the window to fall under its own weight. In the past, various arrangements of springs and brakes have been devised and in general, vendors of window components have had to inventory a large number of components to satisfy the needs of a wide variety of window types used by the general public.

OBJECTS AND SUMMARY OF THE INVENTION

It is an object of the invention to provide a meaningful alternative to prior art window supporting systems.

It is another object of the invention to provide a self-contained spring balance tube which is adaptable to a wide variety of window types.

Accordingly, there is provided a spring balance comprising a spring located within two telescopic tubes. One end of the spring is attached to an end cap. The other end of the spring is attached to an adaptor.

BRIEF DESCRIPTION OF THE DRAWINGS

FIG. 1 is a schematic cross sectional view of a self-contained spring balance tube friction system according to the teachings of the present invention.

FIG. 2 is a perspective view of the device of FIG. 1, partially exploded to illustrate the various components thereof.

BEST MODE AND OTHER EMBODIMENTS OF THE INVENTION

Figure 3:
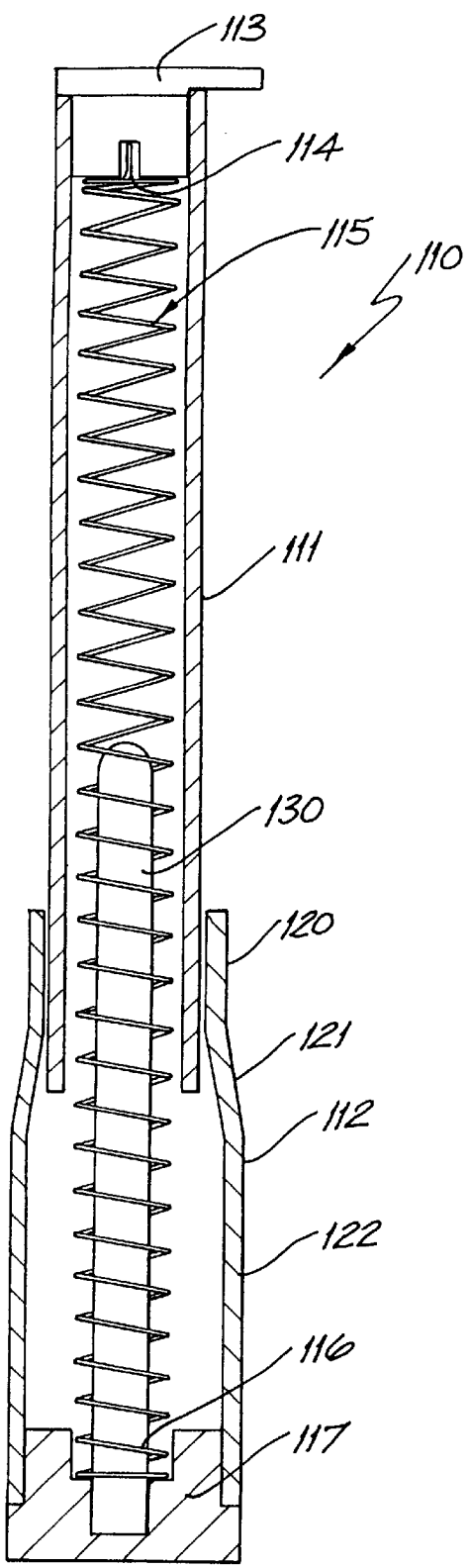
FIG. 3 is a schematic cross-section of another embodiment of the present invention.

As shown in FIG. 1, a spring balance system according to the present invention 10, comprises a first tube 11 which is telescopically received within a second tube 12. In a preferred embodiment the first tube 11 is located, in use, above the second or lower tube 12. An upper end of the first tube 11 is fitted with a top end cap 13. The top end cap 13 supports the upper end 14 of a tension coil spring 15. As best seen in FIG. 1, the spring 15 has a single winding direction. The lower end 16 of the spring 15 engages a separate adaptor 17. The adaptor 17 is preferably a molded plastic and may be fabricated to suit a particular window. The adaptor 17 attaches to the frame of the sliding window. The top end cap 13 is preferably provided with a through hole 18 through which a bolt or other fastener 19 can be passed to affix the top end cap 13 to the window box or other structure which supports the vertically sliding window.

From the above description it will be appreciated that the weight of a vertically sliding window supported by the adaptor 17 is transferred to the tension spring 15. To help maintain the vertically sliding window in any given static position it is preferable to have some degree of friction between the sliding tubes 11, 12. To this end, the larger of the two tubes 12 is provided with a friction collar 20. A tapered portion 21 smoothly blends the smaller diameter friction collar 20 with the larger diameter body 22 of the tube 12. The degree of friction between the two tubes can be tailored by altering the material from which the tubes are fabricated, the length of the cylindrical friction collar 20 or, if required by changing the degree of interference between the friction collar 20 and the smaller tube 11.

It will have been appreciated from the previous description that a window can be supported against the force of gravity by a tension spring. The restorative force of the tension spring in conjunction with the friction existing between the two tubes 11,12 provide a system wherein a window can be easily raised, lowered and maintained in any given position. The device in FIG. 1 is shown in an extended position, with the telescopic tubes 11,12 nearly fully extended. This would correspond to the lowest or nearly the lowest position for a vertical sliding window. Where a tension spring is used, the spring may be pre-tensioned to provide additional restorative force, so long as the spring force doesn't overcome the friction between the two tubes. It will be appreciated that the principle of the invention is equally applicable to a compression coil spring operated device 111 as depicted in FIG. 3. The device depicted in FIG. 3 is also depicted in the extended position but represents the upper most or nearly upper most position of a vertically sliding window. An upper adaptor 113 would be affixed to the sliding window and the lower cap 117 would be affixed to the stationary frame or window box. If required, a rigid rod 130 may be affixed to either the upper adaptor 113 or lower cap 117 so that the compression spring 115, while undergoing compression, does not distort or deform excessively. With respect to the device depicted in FIG. 3, the telescopic tubes 111,112 contact one another along the length of the cylindrical friction collar 120.

Figure 4:
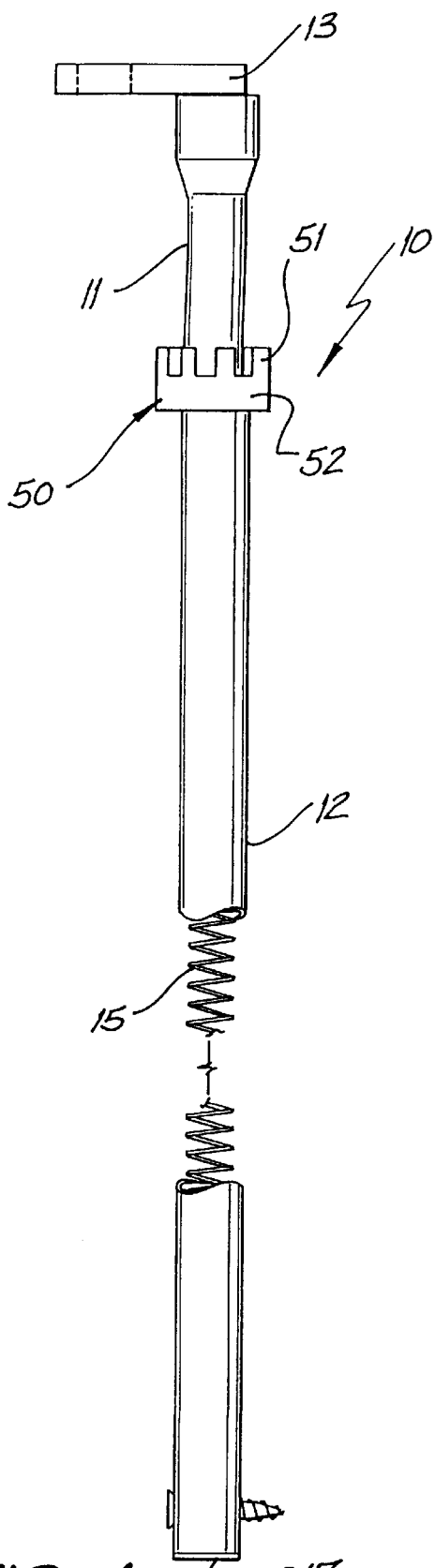
FIG. 4 is a side elevation, partially broken away, showing the friction block.

As shown in FIG. 4, an optional friction block 50 may be provided in addition to, or in lieu of the friction collar 120,20. The friction block 50 includes any number of fingers 51 which extend from a ring 52 which fits on the end of the tube 12. The fingers 51 contact the other tube 11 and grip it enough to let it slide but restraining or retarding free sliding between the tubes 11,12.

The device of the present invention is ideally suited for anodized, powder coated, aluminium or timber windows.

While the present invention has been described and disclosed with reference to particular details of construction, these should be appreciated as having been provided by way of example and not as limitations to the scope or spirit of the present invention. In particular, the configuration of the top end cap and bottom adaptor may be varied to suit specific applications. Further, the precise size, shape and materials associated with the tubes may be varied to suit specific applications.

What I claim is:

1. A self-controlled spring balance apparatus to provide a balance force for a vertically sliding window, comprising:

two tubes, one of a smaller diameter than another of a larger diameter, for relative lengthwise movement in a telescopic arrangement;

a spring extending lengthwise inside of the two tubes;

spring-force means in the two tubes for applying a spring force of the spring to the two tubes dependent upon the relative lengthwise movement of the two tubes;

friction means for a frictional-engagement force between the two tubes; and attaching means for attaching one end of one of the two tubes to a vertically sliding window and the opposite end of the other of the two tubes to a support wherein:

a combination of the frictional-engagement force and the spring force provides said balance force to prevent relative lengthwise movement of two tubes in any static relative lengthwise position when supporting the window, until application of another force to change the position of the window.

2. A self-controlled window balance mechanism to support a sliding window panel on a window jamb for height adjustment relative thereto by providing a balance force, said balance mechanism comprising:

a smaller diameter tube and a larger diameter tube, with the tubes being telescopically arranged so as to have overlapping adjacent portions and opposite distal ends;

an elongated spring within the tubes and extending longitudinally thereof, the spring having opposite ends fixed to the tubes adjacent the distal ends thereof so as to apply a spring force to the tubes;

friction engagement means between the two tubes to inhibit relative movement therebetween by the application thereto of a friction force; and attachment means for attaching one of the tubes to the window panel and the other tube to the window jamb; and wherein a combination of the friction force and the spring force, in use will maintain the window panel at a desired height relative to the window jamb, by providing said balance force.

3. The window balance mechanism of claim 2, wherein said spring is a compression spring.

4. The window balance mechanism of claim 2, wherein said spring is a tension spring.

5. The window balance mechanism of claim 3, wherein said spring is a coil spring, and said balance further includes a rod fixed to one of said tubes and extending longitudinally of the coil spring to inhibit unwanted deformation thereof.

6. The window balance mechanism of claim 2, wherein the larger diameter tube has a tapered collar formed at one end, frictionally engaged with the outer longitudinal surface of the smaller diameter tube to thereby provide said friction engagement means.

7. The window balance mechanism of claim 2, wherein said friction engagement means includes a friction member fixed to an end of the larger diameter tube and frictionally engaging the outer longitudinal surface of the smaller diameter tube.

8. The window balance mechanism of claim 7, wherein said friction member includes a plurality of fingers which frictionally engage the outer surface of the smaller diameter tube.

9. The window balance mechanism of claim 8, wherein said friction member is a ring.

* * * * *